United States Patent [19]

King, Jr.

[11] Patent Number: 5,056,210
[45] Date of Patent: Oct. 15, 1991

[54] METHOD OF RADIALLY FLARING A RESILIENT PIPE LINER

[75] Inventor: Howard W. King, Jr., Midland, Mich.

[73] Assignee: The Dow Chemical Company, Midland, Mich.

[21] Appl. No.: 477,279

[22] Filed: Feb. 8, 1990

[51] Int. Cl.⁵ .............................................. B21D 39/00
[52] U.S. Cl. .................... 29/523; 29/402.09; 29/890.031
[58] Field of Search ................. 29/559, 523, 890.036, 29/890.031, 890.144, 890.15, 402.09, 450; 72/342, 370, 392, 393; 269/48.1, 234

[56] References Cited

U.S. PATENT DOCUMENTS

| | | |
|---|---|---|
| 1,418,721 | 6/1922 | Larson . |
| 1,671,137 | 5/1928 | Teisinger . |
| 1,675,238 | 11/1926 | Walker . |
| 3,192,612 | 7/1965 | Elliott et al. ............... 29/890.15 |
| 3,383,750 | 5/1968 | Schroeder et al. .......... 29/890.15 |
| 3,390,442 | 7/1968 | Sosnowski et al. ......... 29/890.15 |
| 3,691,624 | 9/1972 | Kinly ............................ 29/523 |
| 3,968,552 | 7/1976 | Hunter ......................... 29/890.15 |
| 3,986,383 | 10/1976 | Petteys ........................ 269/48.1 |
| 4,154,083 | 5/1979 | Rothenberger . |
| 4,377,894 | 3/1983 | Yoshida ....................... 29/523 |
| 4,520,547 | 6/1985 | Laursen et al. ............. 29/523 |

Primary Examiner—Irene Cuda
Attorney, Agent, or Firm—Robert M. O'Keefe; Thomas A. Ladd

[57] ABSTRACT

A method of securing a loose polymeric resilient liner to a rigid pipe to permit flaring of the polymeric liner to form a flange joint interface. Apparatus to secure the resilient liner while the polymer liner is flared is also disclosed.

12 Claims, 5 Drawing Sheets

METHOD OF RADIALLY FLARING A RESILIENT PIPE LINER

BACKGROUND OF THE INVENTION

This invention relates generally to a method of securing a loose pipe liner within a rigid conduit typically formed of metal such as mild steel. This invention also relates generally to a method of flaring a loose pipe liner extending from and secured within a rigid conduit.

It is known to line rigid metallic pipe with materials such as rubber, glass, and polymeric materials.

Generally, resilient pipe liners are used to form a corrosion barrier between a rigid metal conduit and a corrosive material carried through the pipe. Lined pipe is also frequently used where it is essential to maintain the purity of process streams, such as in the processing of food products or in generating stations where contamination of deionized water with iron and other metallic ions must be avoided. Also, lined pipe is used where sudden pipe failure due to corrosive action or physical impact would cause personal injury.

Resilient pipe liner is generally made from thermoplastic materials. These materials are rigid at room temperature but become pliable at elevated temperatures. Polymeric thermoplastics in present general use as lining materials for rigid metallic piping systems include polyvinylidene fluoride, polyvinylidene chloride, polypropylene, polyethylene, polytetrafluoroethylene and the like. In addition to the above noted plastic liners, liners made from materials such as rubber are capable of being flared through the instant method.

A polymeric lined pipe system is customarily assembled from individual pipe sections and fittings by bolted flanges at joints of pipe sections and fittings. As used herein, the term "pipe joint", or "joint" will be understood to include flange connections of pipe sections, also often called "spools", flange connections of a pipe fitting such as an elbow or tee with other pipe fittings, and flange fittings for joining with equipment such as pumps and vessels. A surface having a mating flange such as a tank or pump connection may not ordinarily be understood as a flange connection. Nonetheless a surface to which a flange can be secured such as a vessel having a flange connector is here considered a part of a flange fitting. Each pipe joint necessarily involves two pipe sections. It is further understood that a single pipe section may form a part of more than one joint: one joint as in the case of a blind end fitting, two joints as in the case of a linear pipe section, three joints as in the case of a tee or wye fitting.

A complete flange joint, or connection, of pipe sections necessarily comprises two fitting flanges joined by compressing together the faces of the flanges with fasteners, generally threaded bolts, or studs. For pipe lined with a corrosion resistive polymeric liner, the polymeric liner is flared, or molded, radially to extend over the metallic flange face. The polymeric liner is thus formed to a polymeric annular flange. Two or more sections of lined pipe may be joined to form a unitary lined pipe system. A sealing interface is formed by compressing the opposing annular flanges of the flared polymeric liner of each opposing pipe joint section by fasteners joining the metallic flanges in the customary manner of unlined pipe connections. Also, a section of lined pipe may be connected to an unlined pipe section. In the case of a connection of a lined pipe section to an unlined pipe section, the flared polymeric liner of the lined pipe joint section may be compressed to form a sealing interface by an opposing flange of an unlined pipe section. Alternatively, a separate gasket of an elastomeric material may be added to the joint between the flared liner faces.

When dealing with lined pipe spools, the resilient pipe liner will have both ends flared. One end of pipe liner material may be flared prior to inserting the liner into a rigid pipe. The second liner end must be flared with the liner in the bore of the rigid pipe. Alternatively, both ends of the liner may be radially flared while the liner is in the bore of the rigid pipe. Flaring is accomplished after the liner end, which is rigid and unpliable at ambient temperatures, has been heated to a temperature sufficient to make the liner pliable. A heat gun can be used to heat the liner, although any device which brings the liner to a temperature where the liner is pliable will work. A torch may be used to heat the liner. Care must be exercised when using a torch to avoid overheating the thermoplastic liner so as to degrade the liner.

After adequate heating, the now pliable thermoplastic liner may be flared, or molded, radially to extend over the metallic flange face. The flared flange serves to maintain the pipe liner within the conduit by preventing the pipe liner from sliding out through either end of the rigid conduit. The flared flanges also serve to form a seal at a pipe joint. The seal formed by the flared flanges of pipe liner material of separate pipe pieces prevents escape of pipe contents, and prevents contact of pipe contents with the rigid pipe, generally steel, at the pipe joints. The flared liner flange may be trimmed to an appropriate shape after being formed, as necessary.

One method of fabricating a spool of lined pipe begins by inserting loose pipe liner having at least one unflared end into rigid metal pipe. The outer diameter of the liner should be nearly the same dimension, but somewhat smaller than the inner diameter of the rigid pipe so as to permit the liner to slideably engage the rigid pipe. The length of pipe liner to be inserted into the bore of rigid pipe is selected such that the liner extends beyond the end of the rigid conduit a distance that when radially flared, the polymeric liner will form a sufficient flange.

In order to form a flange of the polymeric liner material it is convenient to secure the liner in position relative to the rigid pipe during the mechanical operation of forming the flange of polymeric liner.

A device known in the art used to secure the pipe liner consists of an elastomeric torus compressed between two washers. The uncompressed torus is sized such that the larger circumference can slide inside the bore of the liner. The diameter of the washers approximates the larger diameter of the uncompressed torus. The torus device is used to secure the liner to the rigid pipe by inserting the device into the liner and compressing the torus between the opposing washers. The opposing washers are compressed toward one another by a bolt, or other means. As the minor circumference of the torus is compressed, the major circumference of the torus expands. The expanded major circumference then forceably contacts the liner. The resilient liner material is deflected and in turn forcefully contacts the wall of the bore of the rigid conduit so as to secure the liner within the conduit and maintain the relative position of the liner and the conduit.

The torus device suffers from several disadvantages. For example, the expanded torus and compressed washers block the bore of the liner. As a consequence of the blockage of the liner bore a heat gun used to make the liner pliable develops back pressure increasing the heat gun temperature and thus shortening its life. The application of heat necessary to render the thermoplastic liner pliable may cause the elastomeric torus to exceed the temperature at which the elastomeric torus begins to degrade. The elastomeric torus is frequently made of a rubber compound which has substantially less heat tolerance than resilient pipe liner material such as polytetrafluoroethylene, for example.

Another device known in the art which secures a liner within a rigid conduit resembles a hat expander. The expander device comprises a pair of arms each having a first end and a second end. The first ends contact the pipe liner and are conformed to an axial and circumferential segment of the liner. The second ends are threaded in opposite directions and engage with a single nut. Rotation of the nut in one direction moves both first ends further apart. Rotation of the nut in the opposite direction moves both first ends toward each other. Placed inside the liner, rotation of the nut to separate the first ends forceably engages the liner with the rigid pipe. A disadvantage of this device is that the nut becomes more difficult to turn as the diameter of the pipe liner reduces, and as the distance from the open end of the liner to the expander increases, since the space needed to apply a wrench, or other similar instrument, diminishes.

The skilled artisan will recognize that these problems and others are solved by the present invention which has as an object to provide an improved method of securing the liner within a rigid conduit.

A further object of this invention is to provide a method of conveniently expanding a liner mandrel.

A further object of this invention is to provide a method of securing the relative position of a resilient liner material within a rigid pipe while fashioning a flange from the liner material.

A further object of this invention is to provide a method which would allow lined pipe sections to be fabricated at the construction site as the need arises. Such a method would secure loose pipe liner inside the metal pipe.

Another object of this invention is to facilitate flaring loose pipe liner within a rigid conduit.

SUMMARY OF THE INVENTION

The present invention concerns a method for securing loose pipe liner within a rigid conduit. This method comprises the steps of inserting an expander mandrel into the bore of the loose pipe liner, said expander mandrel comprising: a rigid body having at least one first bore generally perpendicular to the axis of the liner and a tapped bore generally parallel to the axis of the liner, said second bore intersecting said first bore, at least one expander arm having a first beveled end and a second end, said first end slideably engaged in the first bore, said second end conforming to an axial and circumferential segment of the liner: and a bolt having a first end and a second end, said first end being tapered, said taper corresponding to the first beveled end, the bolt being threadably engaged in the threaded bore, said second end of the bolt being configured for turning to advance the bolt in the threaded bore, advancing the bolt in the threaded bore such that the taper of the first end of the bolt engages the first end of the expander arm and thereby forces the expander arm radially outward such that the second end of the expander arm forceably engages the resilient liner causing the resilient liner to in turn forcefully engage the rigid conduit.

Another aspect of this invention concerns a method for flaring an end of a resilient loose pipe liner, the liner being within a rigid conduit, comprising the steps of inserting into the bore of the loose pipe liner an expander mandrel comprising: a rigid body having at least one first bore generally perpendicular to the axis of the liner and a threaded bore generally parallel to the axis of the liner, said second bore intersecting said first bore, at least one expander arm having a first end and a second end, said first end slideably engaged in a first bore and having an inclined slant, said second end conforming to an axial and circumferential segment of the liner: and a bolt having a first end and a second end, said first end being tapered, said taper corresponding to the inclined slant on the first end of the expander arms, the bolt being threadably engaged in the threaded bore, said second end of the bolt being configured for turning to advance the bolt in the threaded bore, advancing the bolt in the threaded bore such that the taper of the first end of the bolt engages the first end of the expander arm and thereby forces the expander arm radially outward such that the second end of the expander arm forceably engages the resilient liner causing the resilient liner to in turn forcefully engage the rigid conduit; heating the resilient loose pipe liner material so as to soften said resilient liner material to permit flaring the resilient liner material: and flaring the heated, pliable resilient liner material.

DETAILED DESCRIPTION

Figure 1:
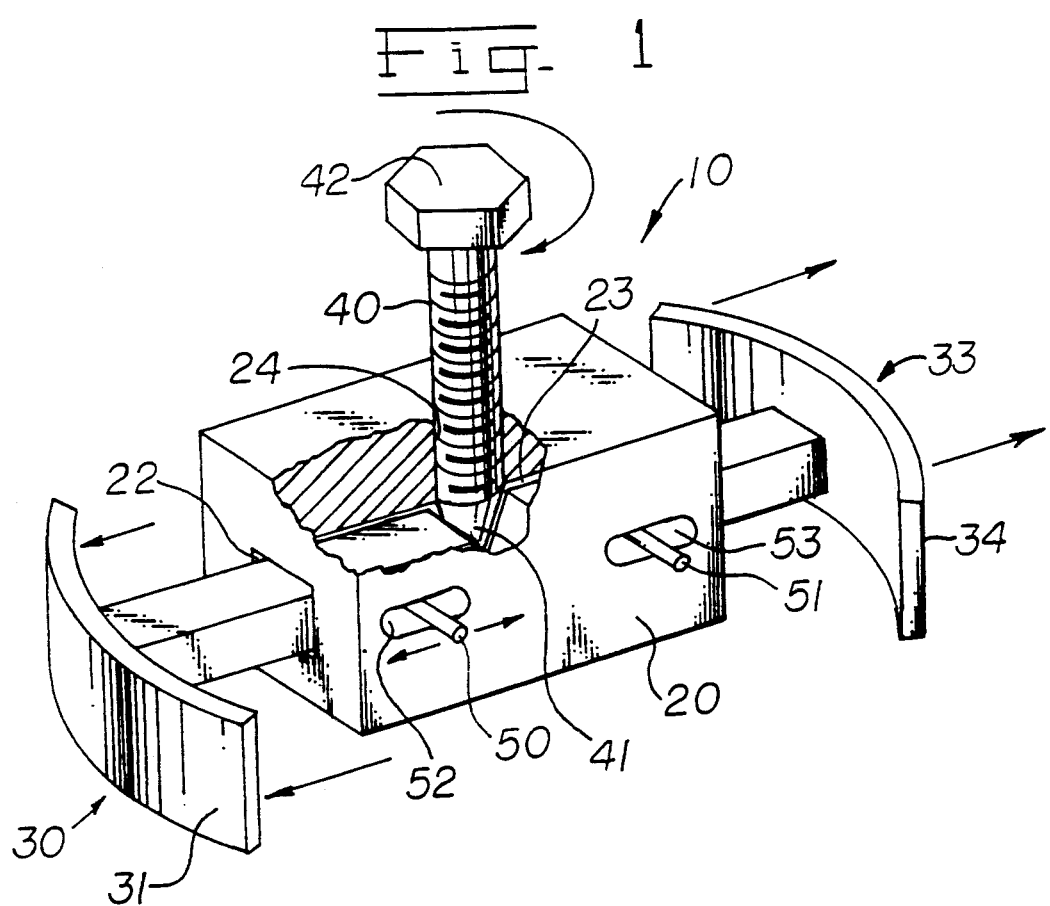
FIG. 1 illustrates an embodiment of a liner mandrel described herein.

The method of flaring a piece of resilient pipe liner begins by securing the pipe liner within a rigid body. It is preferred that the rigid body be a rigid metal conduit. The resilient pipe liner can be any material which becomes pliable when heated. Examples of such liners include thermoplastic liners made from polyvinylidene fluoride, polyvinylidene chloride, polypropylene, polytetrafluoroethylene, and the like which can be made pliable by application of heat. In addition to the above noted plastic liners, liners made from materials such as rubber are capable of being flared through the instant method.

The pipe liner is initially inserted in the bore of a rigid pipe. The outside circumference of the liner and bore will be sized such that the liner will fit within the bore of the rigid conduit, or pipe. The fit between the pipe liner and the rigid pipe is close, but not so close as to render the liner non-slideable within the pipe bore.

When lining pipe, a length of liner material is selected, or prepared, to extend beyond the ends of the spool of rigid pipe by a sufficient distance to provide liner material which when radially flared will form an adequate flange of liner material.

After the liner is in place within the rigid pipe, the liner material is radially flared to form a flange of liner material contiguous to the flange of the rigid pipe. The operation of flaring the liner material generally requires the application of mechanical force to the liner. The application of mechanical force to the liner to form the radial flare of liner material may cause the position of the liner relative to the rigid pipe to change unless the the liner is held in position with respect to the rigid pipe. A mandrel, as described herein, is useful to maintain the position of the liner relative to the rigid pipe during the step of radially flaring the liner material to form a flange.

After the pipe liner has been secured, the length of pipe liner end extending beyond the rigid conduit is heated to a temperature at which the pipe liner becomes pliable. Any means which can controllably heat the pipe liner end is acceptable. A heat gun is a preferred article to heat the pipe liner end.

It is advantageous to heat the end of the liner to be flared so as to lessen degradation and cracking of the liner during the flaring step. The open access to the bore of the liner provided by the described expander mandrel permits heated air from the heat gun, torch, or other suitable heat source to flow past the mandrel within the bore of the pipe liner distally away from the heated end of the pipe liner. Access by hot gas to the bore of the pipe liner distally beyond the mandrel facilitates a more gradual temperature gradient from the heated end of the liner to be flared distally to where the liner remains at ambient temperature. A more gradual temperature gradient is beneficial to reduce the residual stress within the liner resulting from mechanically flaring the liner to form a flange thereof.

Finally, the pliable liner end is flared by use of most any means for flaring. Preferably, a flaring tool known in the art is used. Flaring produces a liner flange which abuts the face of rigid flange of the conduit end. After flaring, the flared thermoplastic liner material may be cut or otherwise shaped as to a desired diameter.

The use and utility of the invention described herein will be further understood by reference to the drawings. So far as practical, the reference numerals identify corresponding features in the various drawings. Referring to the drawing, and to FIG. 1 in particular, shown therein and generally designated by the reference character 10 is an expander mandrel constructed in accordance with, and useful in the practice of, the invention.

Figure 2:
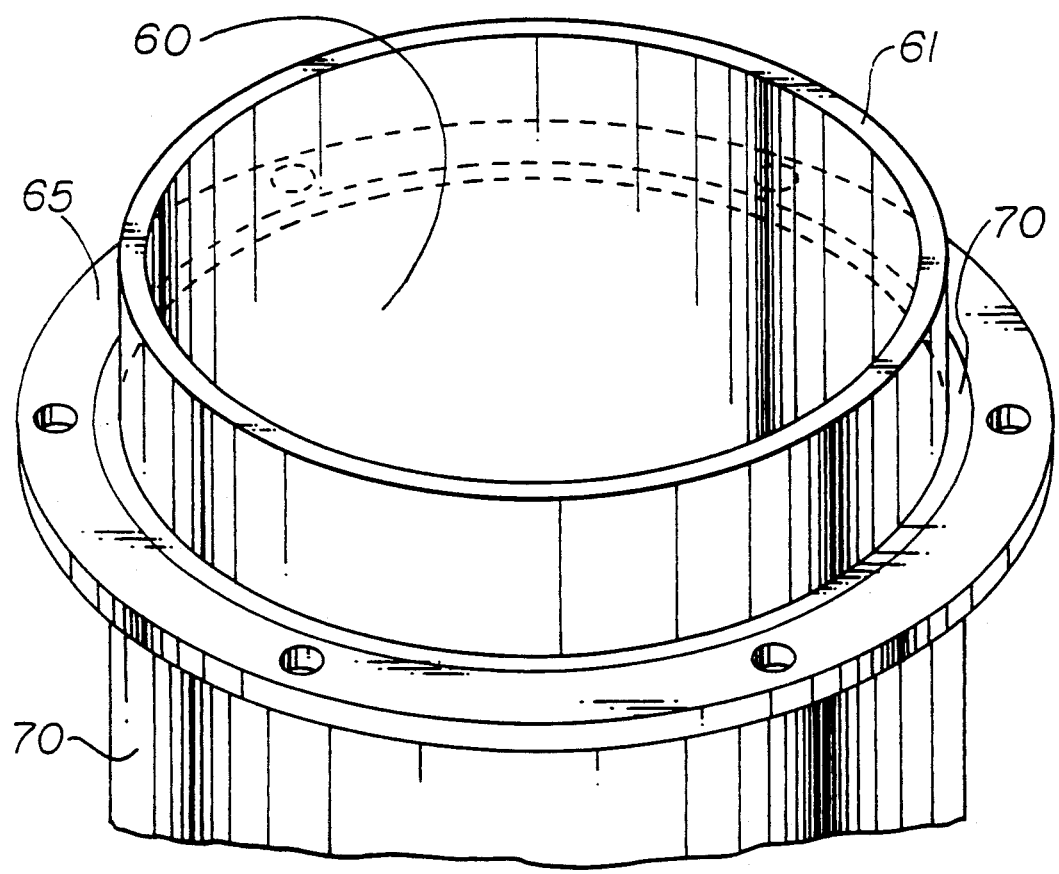
FIG. 2 illustrates a rigid pipe having a liner in the bore of the pipe prepared to receive a liner mandrel in the bore of the liner.

FIG. 2 illustrates the end of a rigid pipe 70, containing a resilient liner 60 extending beyond the end of the rigid pipe. The end of the rigid pipe is shown within a flange 65. As illustrated therein the expander mandrel 10 is in position for forceably engaging a resilient liner 60 extending beyond the rigid conduit 70. The discussion of the invention is expressed generally in terms of, and the illustrations are drawn to depict, lined pipe having a circular cross-section perpendicular to the pipe axis. However, lined pipe within the scope of the invention also includes rigid pipe and pipe liner having a cross-section of geometric shapes other than circular.

The embodiment comprises a body 20 arranged relative to the resilient pipe 60 such that a longitudinal bore 21 is oriented generally perpendicular to the axis of the resilient liner 60. The longitudinal bore 21 having a first bore end 22 and a second bore end 23. The body 20 also contains a threaded bore 24. When positioned for use in a lined pipe, the threaded bore 24 is generally parallel to the axis of the resilient liner 60. The longitudinal bore 21 and the threaded bore 24 intersect.

A first expander arm 30 and a second expander arm 33 are slideably engaged in the first bore end 22 and the second bore end 23, respectively, of the longitudinal bore 21. The first and second expander arms 30, 33 having a first arm end 31, 34 and having a second beveled arm end 32, 35, respectively. Said first arm end 31 of the first expander arm 30 generally conforms to an axial and circumferential segment of the resilient liner 60. Said first arm end 34 of the second expander arm 33 generally conforming to an axial and circumferential segment of the resilient liner 60. Said second beveled arm ends 32, and 35 of the expander arms 30, and 33 correspond to a tapered end 41 of a bolt 40.

The bolt 40 is threadably engaged in the threaded bore 24. The bolt 40 has a second end 42 configured to engage a tool for turning bolt 40 to advance the bolt in the threaded bore 24.

Figure 3:
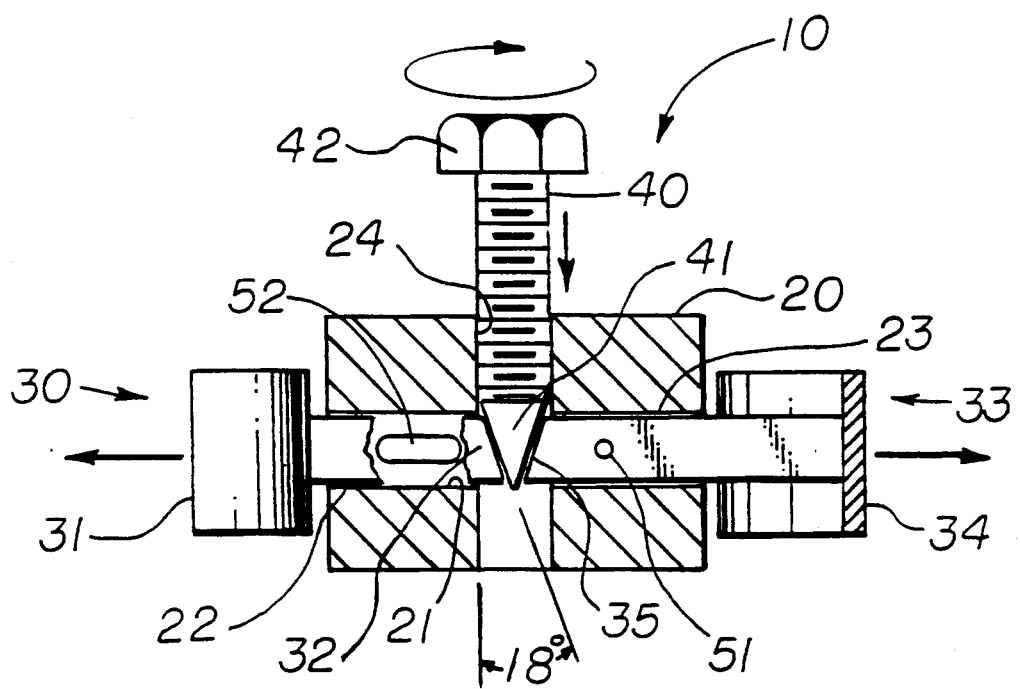
FIG. 3 is a sectional view of an embodiment of a liner mandrel described herein.

First stop means 50 is attached to the first expander arm 30 at a point intermediate between the first end 31 and the second beveled end 32. The stop means 50 extends through a stop bore 52 in the rigid body 20. The stop means 50 therein limits the slideable motion of the expander arm 30 so as to prevent the arm from detaching from the rigid body 20 while in use. The stop means 50 allows slideable motion of the first expander arm 30 so that the resilient liner 60 may be forceably engaged. A second stop means 51 similarly serves the second expander arm 33. FIG. 3 illustrates a view of the expander mandrel 10 having a sectional view of the rigid body 20.

FIG. 3 is a sectional view through the rigid body 20 and a partial cut away view beyond the first expander arm 30. The relationship of the intersecting threaded bore 24 and the longitudinal bore 21 is shown, as is the relationship between the tapered end 41 and the first beveled arm end and the second beveled arm end.

Figure 4:
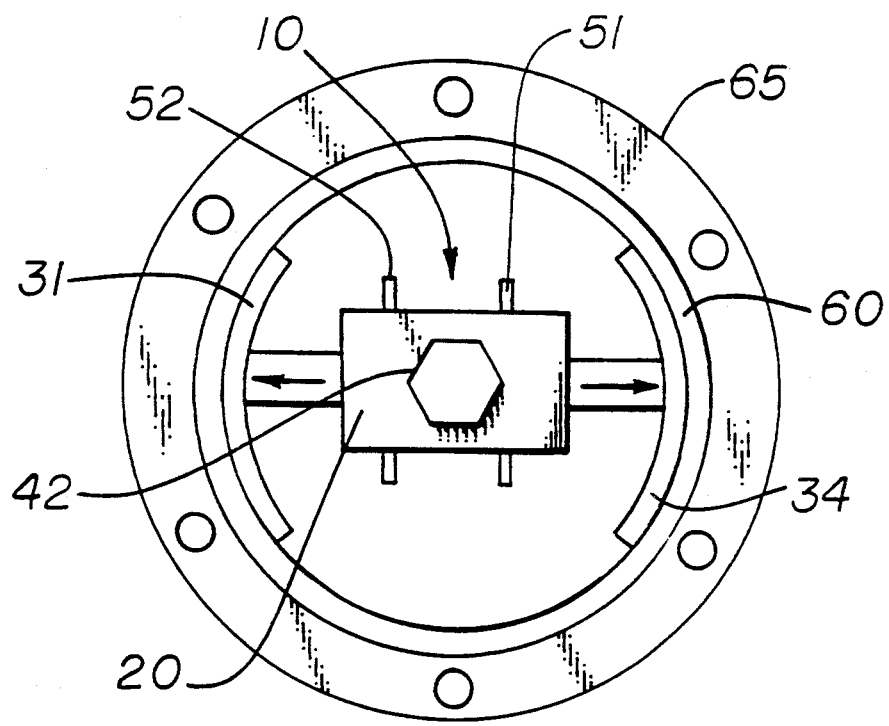
FIG. 4 is an end view of a liner mandrel described herein in place in the bore of a pipe liner, the liner located in the bore of a rigid pipe.

FIG. 4 illustrates and end view of the expander mandrel 10 in place within the bore of a pipe liner 60 which in turn is located within the bore of a rigid pipe 70. The flange of the rigid pipe 65 is also shown.

Figure 5:
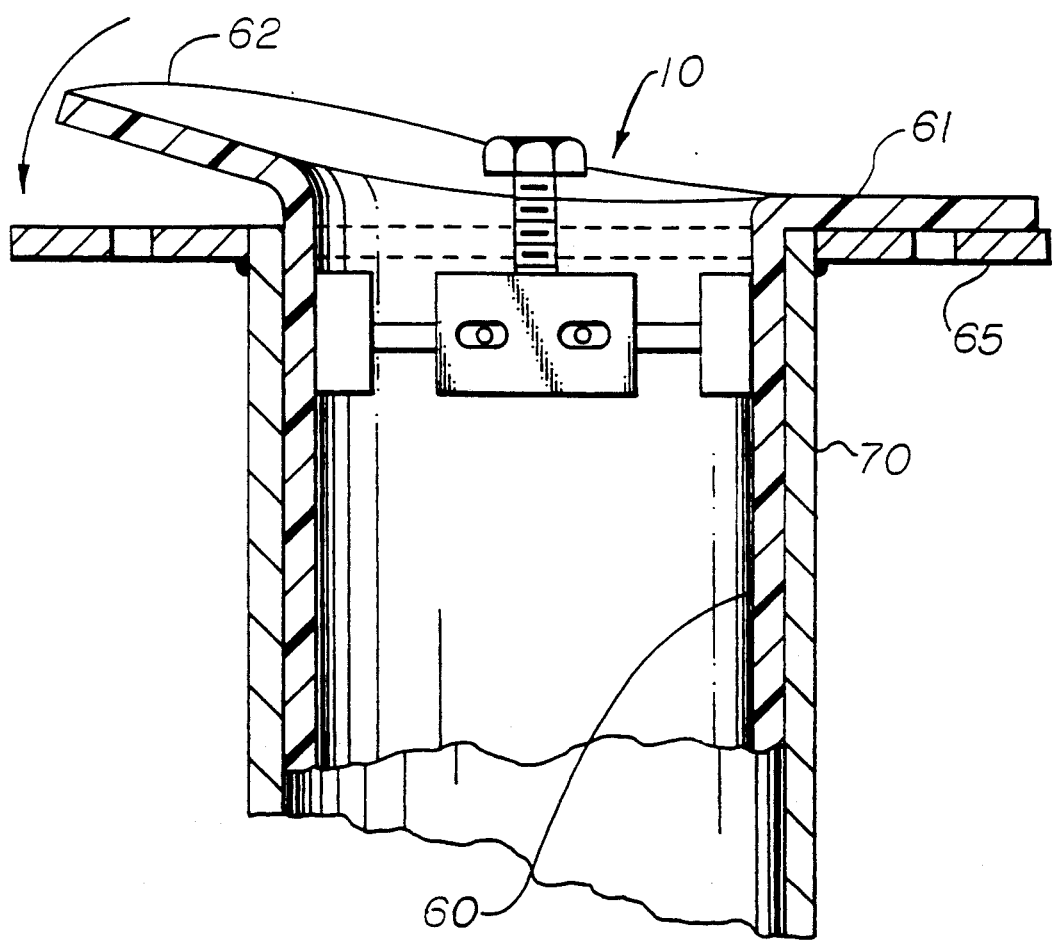
FIG. 5 is a section of a rigid pipe and pipe liner illustrating an embodiment of a liner mandrel described herein in place.

FIG. 5 illustrates the sectional view of the expander mandrel in place within the bore of a pipe liner 60. Radially flared polymeric liner material is shown as a flange of polymeric material 61. An incomplete radially flared flange 62 is shown being formed from the radially flared liner material.

Among the advantages of the invention is that it facilitates the assembly of lined pipe sections utilizing rigid conduits of materials of construction that are more corrosion resistant than mild steel, such as stainless steel or fiber glass reinforced polymeric resin, but are not readily swaged to fit the liner snugly. Instead of swaging the conduit, the present apparatus permits holding a loosely fitting liner in place during flaring of the liner to the conduit flanges at section ends.

What is claimed is:

1. A method for flaring an end of a resilient loose pipe liner within rigid conduit, comprising the steps of:
   (a) inserting into the bore of the loose pipe liner within the conduit an expander mandrel comprising:

a rigid body having at least one longitudinal bore generally perpendicular to the axis of the liner and a threaded bore generally parallel to the axis of the liner, said threaded bore intersecting said longitudinal bore;

at least one expander arm having a first end generally conforming to an axial and circumferential segment of the pipe liner and a second beveled end, each beveled end and a portion of the expander arm contiguous with the beveled end being slideably engaged in each longitudinal bore; and a bolt having a first end and a second end, said first end being tapered, said taper corresponding to each second beveled end of each expander arm, the bolt being threadably engaged in the threaded bore, said second bolt end being configured for turning to advance the bolt in the threaded bore;

(b) advancing the bolt in the threaded bore such that the taper of the first end of the bolt engages the first beveled end of each expander arm thereby forcing each expander arm radially outward such that the second ends of the expander arms forceably engage the resilient liner causing the resilient liner to forcefully engage the rigid conduit;

(c) rendering the resilient liner material pliable; and (d) flaring the pliable resilient liner material to form a flange from liner material.

2. A method for securing a resilient loose pipe liner within rigid conduit, comprising the steps of:

(a) inserting an expander mandrel into the bore of the loose pipe liner, said expander mandrel comprising:

a rigid body having at least one longitudinal bore generally perpendicular to the axis of the liner and a threaded bore generally parallel to the axis of the liner, said threaded bore intersecting said longitudinal bore;

at least one expander arm having a first end generally conforming to an axial and circumferential segment of the pipe liner and a second beveled end, each beveled end and a portion of the expander arm contiguous with the beveled end being slideably engaged in each longitudinal bore; and a bolt having a first tapered end and a second end, said taper corresponding to each second beveled end of each expander arm, the bolt being threadably engaged in the threaded bore, said second bolt end being configured for turning to advance the bolt in the threaded bore, (b) advancing the bolt in the threaded bore such that the taper of the first end of the bolt engages the first end of the expander arm and thereby forces the expander arm radially outward such that the second end of the expander arm forceably engage the resilient liner causing the resilient liner to forcefully engage the rigid conduit.

3. The method of claim 1 wherein the expander mandrel further comprises a stopping means attached to the expander arms for limiting the sliding motion of the expander arm within the rigid body, said stopping means extending through a stop bore in the rigid body.

4. The method of claim 2 wherein the expander mandrel further comprises a stopping means for limiting the sliding motion of the expander arm within the rigid body, said stopping means attached to the expander arms, and said stopping means extending through a stop bore in the rigid body.

5. The method of claim 1 wherein the expander mandrel contains four expander arms.

6. The method of claim 2 wherein the expander mandrel contains four expander arms.

7. The method of claim 1 wherein the expander mandrel contains three expander arms.

8. The method of claim 2 wherein the expander mandrel contains three expander arms.

9. The method of claim 1 wherein the expander mandrel contains two expander arms.

10. The method of claim 2 wherein the expander mandrel contains two expander arms.

11. The method of claim 1 wherein an end of the rigid body conforms to an axial and circumferential segment of the liner.

12. The method of claim 2 wherein an end of the rigid body conforms to an axial and circumferential segment of the liner.

* * * * *